Aug. 1, 1933.                A. BAUMANN                 1,920,675
                        REFRIGERATING MACHINE
                           Filed May 7, 1932
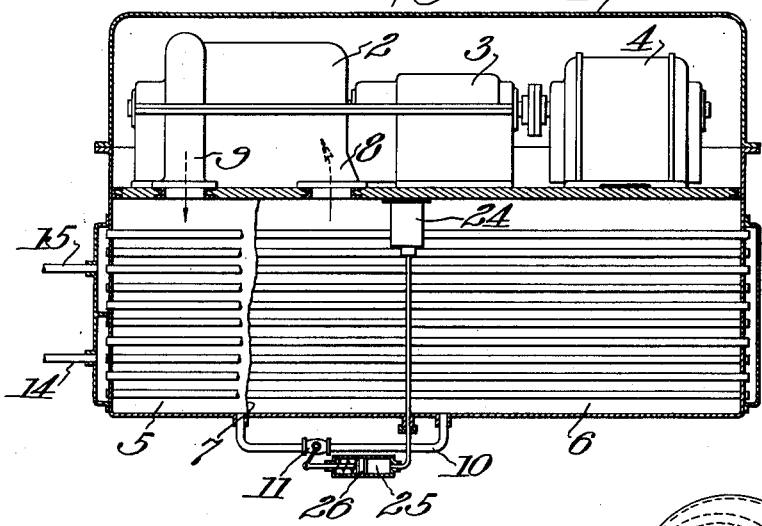
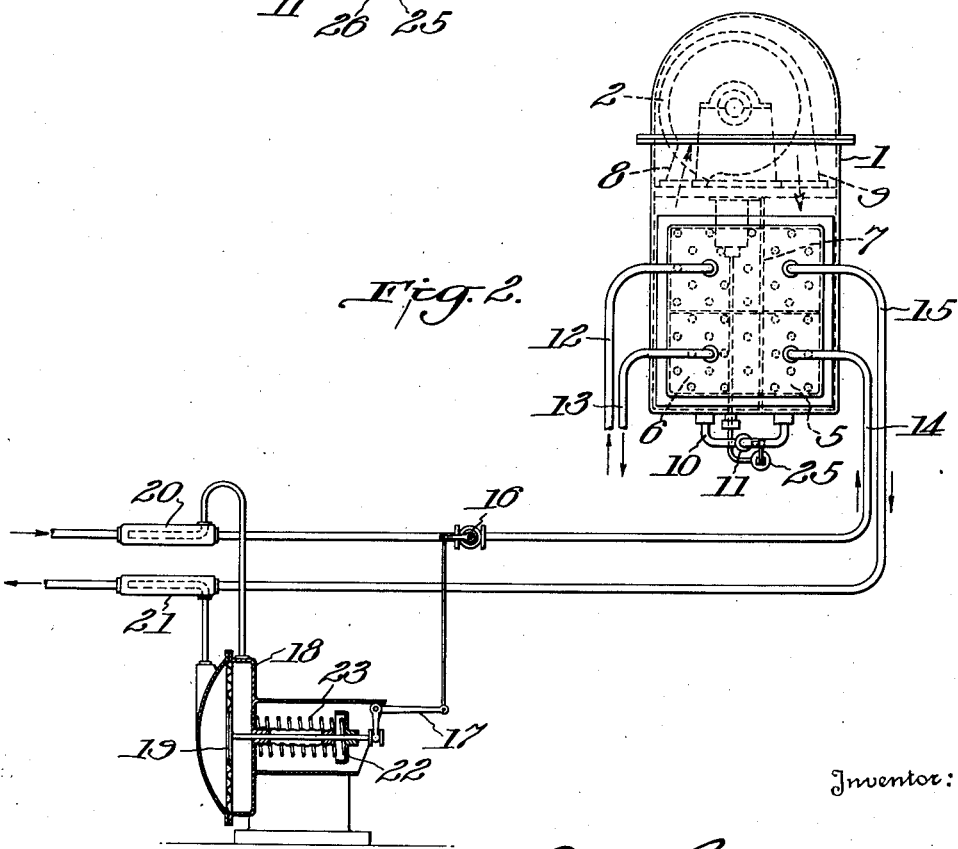
Inventor:
Adolf Baumann,
By Byrnes, Townsend & Potter,
Attorneys.

Patented Aug. 1, 1933

1,920,675

UNITED STATES PATENT OFFICE 1,920,675

REFRIGERATING MACHINE

Adolf Baumann, Wettingen, Switzerland, assignor to Aktiengesellschaft Brown, Boveri & Cie., Baden, Switzerland, a joint stock company Application May 7, 1932, Serial No. 609,875, and in Germany December 20, 1930

8 Claims. (Cl. 62—3)

This invention relates to refrigerating machines and more particularly to an improved system for the regulation of machines of the type including an evaporator, a compressor, and a water-cooled condenser.

It has been proposed to control the quantity of cooling water which is circulated through the condenser to maintain the exit water at a substantially constant temperature or to maintain a substantially constant temperature in the evaporator. While this method of regulation presents the advantage of economy in the quantity of water employed, since the quantity is adjusted to suit the varying requirements of the refrigerating machine, this regulation may not provide the most economical operation when the temperature of the water employed for cooling varies. For example, if the temperature of the water available for cooling decreases, it would be possible to operate at lower condenser pressures, thus reducing the load on the compressor. The known systems of regulation have, however, excluded the possibility of obtaining this substantial benefit from colder cooling water.

An object of the present invention is to provide an improved regulation system for refrigeration machines of the water-cooled condenser type, and in which the full benefit is obtained of any drop in the temperature of the cooling water. A further object is to provide a regulation system for a machine of the type stated, and in which the quantity of cooling water is so regulated as to maintain a constant temperature difference between the water flowing to and flowing from the condenser.

More specifically, an object is to provide a refrigerating machine including a regulation system for adjusting the quantity of condenser cooling water to maintain a constant difference between the temperature of the entrance and exit water, and a control for regulating the load on the compressor to maintain a substantially constant evaporator temperature.

These and other objects and advantages of the invention will be apparent from the following specification when taken with the accompanying drawing, in which, Fig. 1 is a vertical section through a refrigerating machine embodying the invention, and Fig. 2 is an end elevation of the same, a part of the casing being broken away.

For purposes of illustration, the invention is shown as embodied in an inclosed machine of the type in which a heat-transfer medium, such as brine, is circulated between the evaporator and the storage space that is to be cooled.

In the drawing, the reference numeral 1 identifies the housing within which is located a motor-compressor unit comprising a compressor 2, transmission gears 3, and a motor 4, as well as the condenser 5 and evaporator 6. The condenser and evaporator consist of banks of pipes located in compartments, formed by dividing walls 7, in the lower portion of the housing 1. The compressor is provided with a vapor inlet 8 and a vapor outlet 9 which communicate, respectively, with the evaporator and condenser compartments. The conduit 10 by which the liquid refrigerant passes from the condenser to the evaporator is provided with a throttle valve 11 that may be regulated automatically to maintain a constant evaporator temperature or pressure.

The entrance and exit conduits 12, 13 for the heat-transfer medium communicate with the headers of the evaporator 6, and the entrance conduit 14 and exit conduit 15 for the condenser cooling water open into the headers of the condenser 5.

The construction of the elements so far described may be varied at will to meet the design requirements for a particular installation. In accordance with the present invention, the quantity of cooling water circulated through the condenser 5 by conduits 14, 15 is regulated to maintain a constant temperature difference between the water in these conduits, i. e., to effect a constant rise in the temperature of the water passed through the condenser.

As shown in Fig. 2, this regulation of a control valve 16 in one of the water conduits may be effected by connecting the stem of valve 16 to the control lever 17 of a differential pressure regulator. The regulator includes a casing 18 that is divided into two compartments by a diaphragm 19, the pressure in the respective compartments being determined by the thermostats 20, 21 located, respectively, in or adjacent the water entrance conduit 14 and the water exit conduit 15. The stem which connects the diaphragm 19 to the lever 17 is threaded and carries a nut 22 that may be adjusted along the stem to regulate the pressure exerted on the stem by a spring 23, thus controlling the predetermined temperature difference which balances the forces acting upon the opposite sides of the diaphragm 19.

As indicated above, the work of the compressor may be regulated automatically in accordance with varying refrigerating requirements. This control may take the form of a thermostat 24 in the evaporator compartment and communicating with a cylinder 25 having therein a piston 26 that is connected to the stem of the throttle valve 11.

The operation of the refrigerating machine is as follows.

In the case of variations in load of refrigeration requirements, and with a constant cooling water temperature, the quantity of water is adjusted to the load since the valve 16 is automatically positioned to maintain a constant temperature difference between the entrance and exit cooling water, by thermostats 20, 21 which determine the position of the diaphragm 19. At the same time, the compressor load is automatically controlled in accordance with changing refrigeration requirements through the evaporator chamber thermostat 24 and the throttle valve 11.

In the case of a constant refrigeration demand with variations in the temperature of the cooling water, the quantity of cooling water supplied to the condenser 5 remains unchanged but the temperature, and pressure, within the condenser varies with the changing temperature of the entrance cooling water. This change in the condenser pressure would be reflected, if no control of the compressor were provided, in a change in the temperature of the evaporator or of the exit circulating medium in conduit 13. In the described apparatus, this tendency for the evaporator or brine temperature to vary with changes in the cooling water temperature is counteracted by the automatic adjustment of the compressor load through the thermostat 24.

With variations in both the refrigerating requirements and the cooling water temperature, the action will be a combination of the operations just described. The invention thus provides for efficient operation since the control is not based upon a constant exit temperature of the cooling water but upon a constant cooling action, assuming constant load, of the cooling water, which cooling action is independent of the absolute temperature of the cooling water.

It will be apparent that the invention is not limited to the specific form of cooling water control herein illustrated and described, or to a control of the compressor load by a throttling of the flow of liquid refrigerant to the evaporator. In accordance with known practice, the control of the compressor may be effected by regulating the operating speed of the compressor, by adjustment of a by-pass in the refrigerant circuit, and/or by an adjustment of the effective portion of the evaporator.

It is therefore to be understood that changes may be made in the several parts, their relative size, shape and relationship without departure from the spirit of the invention as set forth in the following claims.

I claim:

1. A refrigerating machine of the type including a water-cooled condenser, and means for controlling the quantity of water circulated through said condenser, said controlling means including an adjustable element for regulating the flow of the cooling water, and means including thermostats at the water inlet to and the water exit from the condenser for adjusting said control means to maintain a substantially constant difference between the temperature of the water flowing to and the water leaving said condenser.

2. The combination with a refrigerating machine comprising an evaporator, a compressor, a condenser, and means for circulating cooling water through said condenser, of means for adjusting the quantity of water circulated through said condenser in accordance with the difference between the entrance and the exit temperatures of the cooling water.

3. A refrigerating machine including a condenser, means for circulating cooling water through said condenser, and means operable independent of the load on said machine to maintain a substantially constant temperature difference between the cooling water flowing to and leaving said condenser.

4. In a refrigerating machine, the combination with a compressor, a water-cooled condenser, an evaporator, and means for adjusting the load on said compressor in accordance with varying refrigeration requirements, of means for varying the pressure within said condenser in accordance with variations in the temperature of the cooling water supplied to said condenser.

5. In a refrigerating machine of the type including a compressor, a water cooled condenser and an evaporator, the combination with means for controlling the load on said compressor as the refrigerating requirement varies, of means independent of the temperature of the available cooling water for maintaining a substantially constant difference between the temperatures of the water flowing to and leaving said condenser.

6. In a refrigerating machine of the compressor-condenser-evaporator type, the combination with a compressor, a condenser, and means for automatically regulating the compressor load as the refrigerating requirement varies, of means for supplying cooling water to said condenser, and means operable independent of the temperature of the available cooling water to control the quantity of cooling water supplied to said condenser as the refrigeration requirement varies.

7. A refrigerating machine comprising an evaporator, means for circulating a cooling medium through said evaporator, a compressor, a condenser, means for circulating a cooling fluid through said condenser, means independent of the absolute temperature of said cooling fluid for effecting under constant load a constant cooling effect from the circulation of cooling fluid through said condenser, whereby the condenser temperature varies with the temperature of the entrance cooling fluid, and means for automatically varying the load on said compressor to maintain a substantially constant temperature at said evaporator.

8. In a refrigerating machine, the combination with a compressor, a condenser, an evaporator, and means for throttling the passage of liquid refrigerant from said condenser to said evaporator as the load on said machine varies, of means for circulating a cooling fluid through said condenser, and means for maintaining a constant difference between the temperatures of the water flowing to and leaving said condenser.

ADOLF BAUMANN.